US010545345B2

(12) United States Patent
Han

(10) Patent No.: US 10,545,345 B2
(45) Date of Patent: Jan. 28, 2020

(54) HEAD-MOUNTED DISPLAY DEVICE WITH FUNCTION OF TOUCH INPUT AND TOUCH CONTROL METHOD THEREOF

(71) Applicant: SHENZHEN ROYOLE TECHNOLOGIES CO. LTD., Shenzhen, Guangdong (CN)

(72) Inventor: Chao Han, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 15/751,427

(22) PCT Filed: Dec. 30, 2015

(86) PCT No.: PCT/CN2015/099868
§ 371 (c)(1),
(2) Date: Feb. 8, 2018

(87) PCT Pub. No.: WO2017/113188
PCT Pub. Date: Jul. 6, 2017

(65) Prior Publication Data
US 2018/0239142 A1 Aug. 23, 2018

(51) Int. Cl.
*G02B 27/01* (2006.01)
*G06F 3/041* (2006.01)
(Continued)

(52) U.S. Cl.
CPC ......... *G02B 27/0172* (2013.01); *G06F 3/047* (2013.01); *G06F 3/0416* (2013.01); *G06F 3/0488* (2013.01); *G06F 3/03547* (2013.01)

(58) Field of Classification Search
CPC ............ G02B 27/0172; G02B 27/0176; G06F 3/04883; G06F 3/011; G06F 1/163;
(Continued)

(56) References Cited

U.S. PATENT DOCUMENTS 8,217,856 B1 * 7/2012 Petrou .................. G02B 27/017
345/8
10,156,721 B2 * 12/2018 Scott ....................... G06F 3/013
(Continued)

FOREIGN PATENT DOCUMENTS

CN            1648840 A      8/2005
CN         201278050 Y      7/2009
(Continued)

OTHER PUBLICATIONS

International search report issued in corresponding international application No. PCT/CN2015/099868 dated Sep. 28, 2016.
(Continued)

*Primary Examiner* — Ibrahim A Khan
(74) *Attorney, Agent, or Firm* — Hauptman Ham, LLP

(57) ABSTRACT

The present invention provides a head-mounted display device, comprising a head-mounted apparatus, a functional apparatus, and a data line coupled the head-mounted apparatus to the functional apparatus. The head-mounted apparatus comprises a display apparatus for providing a near-eye display. The functional apparatus is configured to transmit corresponding signals to the head-mounted apparatus through the data line. The head-mounted display device further comprises a touch pad and a processor. The touch pad is located on the data line, configured to generate a touch signal in response to a touch operation. The processor is configured to generate a corresponding control signal according to the touch signal. The present invention further discloses a control method of the head-mounted display device. In the head-mounted display device and the control method of the present invention, the touch panel is located on the data line to facilitate user's input.

17 Claims, 3 Drawing Sheets

(51) Int. Cl.
*G06F 3/047* (2006.01)
*G06F 3/0488* (2013.01)
*G06F 3/0354* (2013.01)

(58) Field of Classification Search
CPC ...... G06F 3/0488; G06F 3/047; G06F 3/0416; G06F 3/03547
See application file for complete search history.

(56) References Cited

U.S. PATENT DOCUMENTS

| | | | | |
|---|---|---|---|---|
| 10,302,951 | B2* | 5/2019 | Lyons | G06F 3/0231 |
| 2004/0001106 | A1* | 1/2004 | Deutscher | G06F 16/40 |
| | | | | 715/838 |
| 2005/0003851 | A1* | 1/2005 | Chrysochoos | G06F 3/03547 |
| | | | | 455/550.1 |
| 2007/0083911 | A1* | 4/2007 | Madden | G06F 3/0482 |
| | | | | 725/135 |
| 2007/0237170 | A1* | 10/2007 | Proctor | H04R 1/1033 |
| | | | | 370/462 |
| 2010/0117975 | A1 | 5/2010 | Cho | |
| 2011/0169928 | A1 | 7/2011 | Gassel et al. | |
| 2012/0200478 | A1 | 8/2012 | Kobayashi | |
| 2012/0204106 | A1* | 8/2012 | Hill | G06F 3/04883 |
| | | | | 715/716 |
| 2013/0022214 | A1* | 1/2013 | Dickins | H04R 1/083 |
| | | | | 381/74 |
| 2013/0207715 | A1 | 8/2013 | Salo et al. | |
| 2014/0098009 | A1 | 4/2014 | Prest et al. | |
| 2014/0105412 | A1* | 4/2014 | Alves | G10K 11/178 |
| | | | | 381/71.6 |
| 2014/0111838 | A1* | 4/2014 | Han | G02B 27/017 |
| | | | | 359/13 |
| 2015/0061974 | A1* | 3/2015 | Kobayashi | G02B 27/017 |
| | | | | 345/8 |
| 2015/0258431 | A1* | 9/2015 | Stafford | A63F 13/213 |
| | | | | 463/31 |
| 2016/0063232 | A1* | 3/2016 | Seol | G06F 3/03547 |
| | | | | 726/19 |
| 2016/0100244 | A1* | 4/2016 | Gentile | H04R 1/1041 |
| | | | | 345/174 |
| 2016/0238842 | A1* | 8/2016 | Sendai | G02B 27/0176 |
| 2016/0378204 | A1* | 12/2016 | Chen | G01C 3/08 |
| | | | | 345/156 |

FOREIGN PATENT DOCUMENTS

| | | |
|---|---|---|
| CN | 103076678 A | 5/2013 |
| CN | 103576578 A | 2/2014 |
| CN | 103901791 A | 7/2014 |
| CN | 104106022 A | 10/2014 |
| CN | 104714302 A | 6/2015 |
| CN | 204719350 U | 10/2015 |
| JP | 2006189476 A | 7/2006 |
| JP | 2013134532 A | 7/2013 |
| JP | 2014142985 A | 8/2014 |
| JP | 2015068685 A | 4/2015 |
| JP | 2015087581 A | 5/2015 |
| JP | 2015143812 A | 8/2015 |
| KR | 20120100007 A | 9/2012 |

OTHER PUBLICATIONS

European Search Report dated Jun. 12, 2019, issued in corresponding European Patent Application No. 15911817.3.

* cited by examiner

HEAD-MOUNTED DISPLAY DEVICE WITH FUNCTION OF TOUCH INPUT AND TOUCH CONTROL METHOD THEREOF

RELATED APPLICATIONS

The present application is a National Phase of International Application Number PCT/CN2015/099868, filed Dec. 30, 2015.

TECHNICAL FIELD

This disclosure relates to display devices, and more particularly relates to a head-mounted display device and a control method thereof.

BACKGROUND

Currently, the head-mounted display device generally includes a head-mounted section and a function apparatus. Therein, the head-mounted section comprises a display portion and an earphone portion. The display portion is configured to provide display images. The earphone portion is configured to provide sound. The function apparatus includes a function control module, for example, including a battery, a processor, a storage module, and may further include a wireless module, a communication interface, such as an HDMI, a USB and the like. The function apparatus is coupled to the head-mounted section through a data line. The data line is mainly configured to transmit video/audio signals, and may further configured to transmit power signals, control signals or the like. In the prior art, the head-mounted display device generally equips a touch pad as an input device. The touch pad is generally located on the earphone portion or the function apparatus. However, when the touch pad is located on one side of the earphone, such as a right side, it is inconvenience for the user who is left-handedness. Moreover, adding a touch pad on the earphone increases a volume of the earphone and a weight of the head-mounted section. When the touch pad is located on a box end, since sight is covered when the user has worn the product, a position on the box is not easy to be positioned, and the box needs to be always held, which increases the burden. Furthermore, in the case of a battery including in the box end, it may generate heat and feel poor in hand.

SUMMARY

Embodiments of the invention provide a head-mounted display device and a control method thereof, in which the touch pad is disposed on a data line, it is thus convenient for the user performing input, a problem of installing on the function apparatus or the head-mounted apparatus is avoided.

Embodiments of the invention provide a head-mounted display device, comprising a head-mounted apparatus, a functional apparatus, and a data line coupled the head-mounted apparatus to the functional apparatus. The head-mounted apparatus comprises a display apparatus for providing a near-eye display. The functional apparatus performs signal transmission with the head-mounted device through the data line. The head-mounted display device further comprises a touch pad and a processor. The touch pad is located on the data line, configured to generate a touch signal in response to a touch operation. The processor is configured to generate a corresponding control signal according to the touch signal.

Embodiments of the invention provide a control method of a head-mounted display device. The head-mounted display device comprises a head-mounted apparatus, a functional apparatus, a data line coupled the head-mounted apparatus to the functional apparatus, and a touch pad located on the data line. The method comprises steps: generating a touch signal in response to a touch operation by the touch pad; determining a corresponding function according to the touch signal and an output state of the head-mounted apparatus; by the head-mounted display device and outputting a control signal of controlling the corresponding function so as to control to execute the corresponding function.

The head-mounted display device and the control method of the present invention brings convenience to the users for performing input and avoids a problem of installing the touch pad on the function apparatus or the head-mounted apparatus through disposing the touch pad on the data line.

BRIEF DESCRIPTION OF THE ACCOMPANYING DRAWINGS

To describe the technology solutions in the embodiments of the present invention more clearly, the following briefly introduces the accompanying drawings required for describing the embodiments. Obviously, the accompanying drawings in the following description show merely some embodiments of the present invention, Those of ordinary skill in the art may also derive other obvious variations based on these accompanying drawings without creative efforts.

DETAILED DESCRIPTION OF ILLUSTRATED EMBODIMENTS

The technical solution in the embodiments of the present invention will be described clearly and completely hereinafter with reference to the accompanying drawings in the embodiments of the present invention. Obviously, the described embodiments are merely some but not all embodiments of the present invention. All other embodiments obtained by a person of ordinary skilled in the art based on the embodiments of the present invention without creative efforts shall fall within the protection scope of the present invention.

Figure 1:
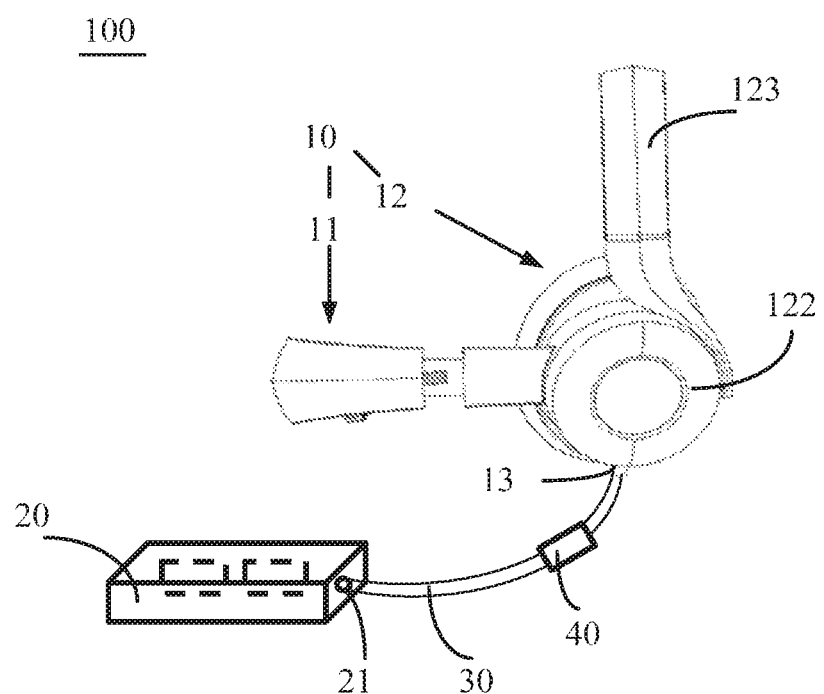
FIG. 1 is a stereo schematic view of a head-mounted display device in accordance with an embodiment of the present invention.
Figure 2:
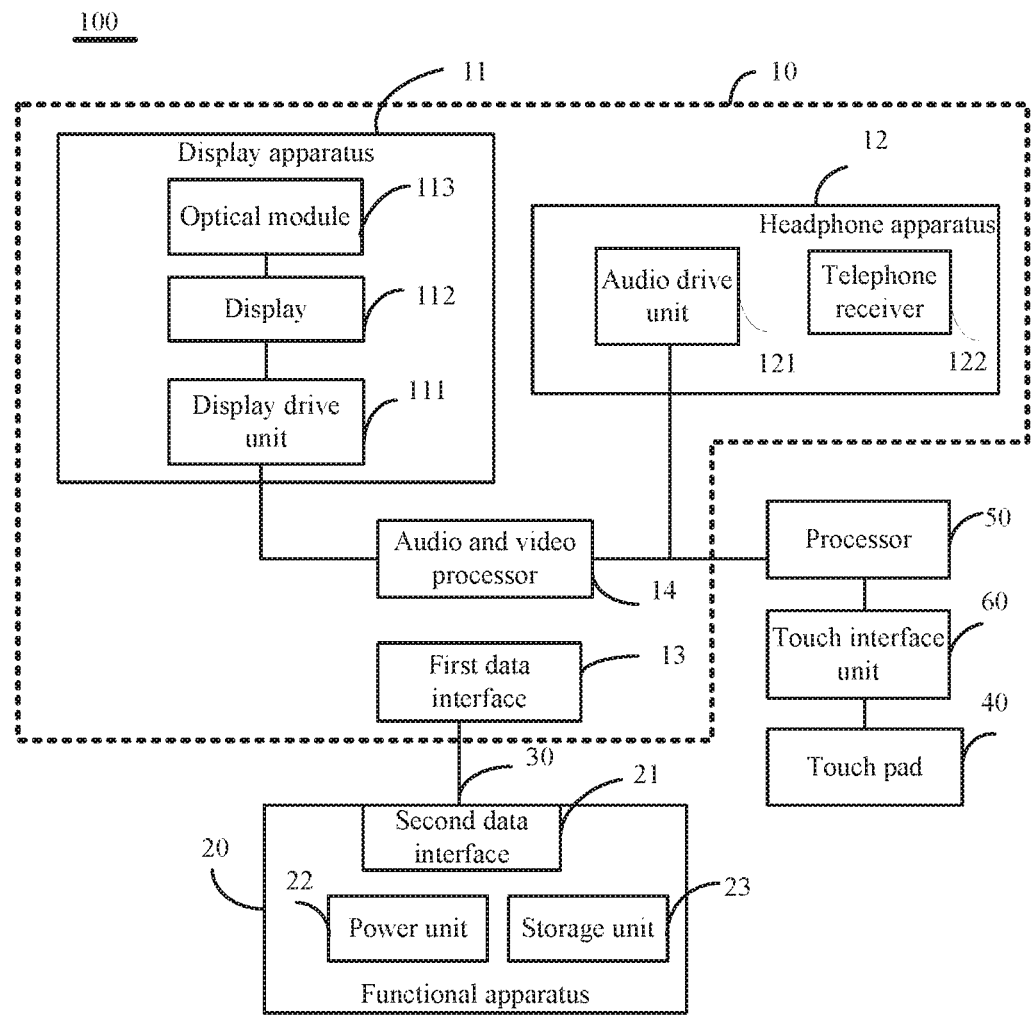
FIG. 2 is a functional block diagram of the head-mounted display device in an embodiment of the present invention.

Referring to FIGS. 1 and 2 together, FIG. 1 is a stereo schematic view of a head-mounted display device 100 in accordance with an embodiment of the present invention. The head-mounted display device 100 includes a head-mounted apparatus 10, a functional apparatus 20, a data line 30, a touch pad 40 located on the data line 30, and a processor 50. The head-mounted apparatus 10 and the functional apparatus 20 perform signal transmission through the data line 30. Therein, the functional apparatus 20 is a control device having a shape of box.

The touch pad 40 is located on the data line 30, configured to generate a touch signal in response to a touch operation. The processor 50 is configured to receive the touch signal and generate a corresponding control signal according to the touch signal so as to control to execute a corresponding function.

In one embodiment, the head-mounted display device 100 further includes a touch interface unit 60. The touch pad 40 is coupled to the processor 50 through the touch interface unit 60, and transmits the touch signal to the processor 50 through the touch interface unit 60.

In one embodiment, the processor 50 and the touch interface unit 60 are located on the functional apparatus 20, and are electrically coupled to each other. The processor 50 outputs the corresponding control signal through the data line 31, or outputs the corresponding data to the head-mounted apparatus 10 according to the control signal, so as to control the head-mounted apparatus 10 to execute the corresponding function.

The head-mounted apparatus 10 includes a display apparatus 11 and an earphone apparatus 12 coupled to each other. The display apparatus 11 is configured to provide display images. The earphone apparatus 12 is configured to provide sound.

In another embodiment, the processor 50 and the touch interface unit 60 are located on the earphone apparatus 12 or the display apparatus 11 of the head-mounted apparatus 10, and the processor 50 is electrically coupled to the touch interface unit 60.

Therein, the touch pad 40 is a flexible touch pad, and wraps around a periphery of the data line 30. When the touch interface unit 60 is located on the functional apparatus 20, one end of the touch pad 40 extends to a location close to the functional apparatus 20, and further coupled to the touch interface unit 60 through a plug connection way or other ways. Therefore, the touch panel 40 establishes a data connection with the processor 60 through the touch interface unit 40.

In comparison with a current way of placing the touch pad 40 on the functional apparatus 20 or the earphone apparatus 12, a volume and a weight of the functional apparatus 20 or the earphone apparatus 12 can be decreased. Moreover, in the data line 30 of the present invention, a touch signal transmission wire for transmitting the touch signal from the earphone apparatus 12 to the functional apparatus 20 may also be omitted, and a size of the data line 30 is also reduced.

Referring to FIG. 2 together, FIG. 2 is a functional block diagram of the head-mounted display device 100. In one embodiment, the head-mounted apparatus 10 further includes a first data interface 12 and an audio and video processor 14. The functional apparatus 20 includes a second data interface 21, a power unit 22 and a storage unit 23. The storage unit 23 stores a number of audio and video files. Therein, the first data interface 13 and the audio and video processor 14 can be located on any one of the display apparatus 11 and the earphone apparatus 12. FIG. 1 shows an example that the first data interface 13 is located on the earphone apparatus 12.

The first data interface 122 of the head-mounted apparatus 10 is coupled to the second data interface 21 of the functional apparatus 20 through the data line 30, a connection between the head-mounted apparatus 10 and the functional apparatus 20 is accordingly established. The power unit 22 of the functional apparatus 20 provides a working voltage to the head-mounted apparatus 10 through the data line 30. The data line 30 is configured to supply power and transmit data, including a power supply wire core for supplying power, and a control signal wire core for transmitting the control signal, and the like.

In this embodiment, the processor 50 is electrically coupled to the touch pad 40 through the touch interface unit 60. The processor 50 is configured to receive the touch signal generated by the touch pad 40, and determine the corresponding function according to the touch signal, and further generate the control signal for controlling to execute the corresponding function.

In this embodiment, when the processor 50 receives the touch signal, the processor 50 estimates an output state of the head-mounted apparatus 10, and determines the corresponding function according to the touch signal and the current output state. In detail, when the processor 50 receives the touch signal, the processor 50 estimates whether the current output state is an audio and video playing state or not. When the processor 50 determines that the current output state is not the audio and video playing state, and the touch operation is a sliding operation, the processor 50 generates a control signal for menu option switching. When the processor 50 determines that the current output state is the audio and video playing state, and the touch operation is a click, the processor 50 generates a control signal of playing the current audio and video file or pause the current audio and video file, or the touch operation is a double-click, the processor 50 generates a control signal of awakening a menu, or the touch operation is the sliding operation, the processor 50 generates a control signal of adjusting the playing volume, or the like.

In this embodiment, the click and the double-click are both touch operations which are performed by at least two fingers simultaneously. The processor 50 determines that there are at least two fingers sliding when it is determined that there are at least two touch points according to the touch signal. The processor 50 determines that it is the click when a touching time duration is less than a first time duration, such as 0.2 seconds, according to the received touch signal, and determines that it is the double-click when there are two clicks at a predefined time duration, such as 1 seconds, according to the received touch signal. When the processor 50 determines that the touching time duration of at least two touch points is greater than a second time duration, such as 1 seconds, according to the received touch signal, the processor 50 determines whether the coordinates of the touch points are changed. If the coordinates of the touch points are changed, the processor 50 determines that it is the sliding operation, and further adjusts the volume according to a changing direction of the coordinates of the touch points. For example, when it is determined that the changing direction of the coordinates of the touch points is a first direction, the volume is controlled to increase, when it is determined that the changing direction of the coordinates of the touch points is a second direction, the volume is controlled to decrease.

In one embodiment, the processor 50 determines whether the touch operation is a locking or unlocking touch operation according to the touch signal, and further generates a corresponding locking or unlocking control signal. In detail, in this embodiment, the locking or unlocking touch operation is a long press operation. When the processor 50 determines that the touching time duration is continuously greater than the second time duration and the coordinates of the touch points are not changed, it is determined to be the long press operation. The processor 50 controls the touch pad 40 to switch to be a locking state or an unlocking state according to the current state of the touch pad 40. That is, a control signal for controlling the touch pad 40 to switch to be the locking state or the unlocking state is generated to the touch pad 40, and the touch pad 40 is controlled to lock or unlock according to the control signal. For example, when the touch operation is the long press touch operation and the current state of the touch pad is in the unlocking state, the touch pad 40 is thus controlled to be locked. When the touch pad is in the locking state, the touch pad 40 is thus controlled to be unlocked.

When the touch pad 40 is locked, the processor 50 receives the touch signal generated by the touch pad 40 but does not respond. Unless the touch signal is corresponding to a lock/unlock operation. Therefore, when the touch pad 40 is not needed to use, the touch pad 40 can be locked, thereby avoiding wrong operations. Obviously, when the touch pad 40 is unlocked, the processor 50 receives the touch signal generated by the touch pad 40 and further processes it accordingly.

In one embodiment, when the processor 50 determines that the touch operation is the sliding operation, and the current state of the head-mounted apparatus 10 is the audio and video playing state, the processor 50 further determines the corresponding function according to the sliding direction, and generates the control signal for executing the corresponding function. Therein, when the processor 50 determines that the sliding direction is a direction of sliding up and down, a control signal for adjusting the volume is adjusted. When the processor 50 determines that the sliding direction is a direction of sliding left and right, the corresponding function is determined to be fast forward or fast backward, a control signal for controlling the audio and video file currently to play fast forward or fast backward is generated. Therein, the direction of sliding up and down is sliding on the touch pad 40 and sliding along a lengthwise direction of the data line 30 located on the touch pad 40. The direction of sliding left and right is sliding on the touch pad 40 and sliding along a direction perpendicular to the data line 30. For example, the data line is pinched by two fingers of the user and then twisted.

Obviously, the touch operations are but not limited to above touch operations. The functions are but not limited to above functions. The relationship between the touch operations and the functions are but not limited to above relationship. For example, the touch operation can also be a circle operation, when the current interface is an interface of playing audio and video, the corresponding function is loop playback. In other embodiment, the double click is corresponding to the function of locking/unlocking, the long press operation is corresponding to the function of awakening menu.

In some embodiments, the processor 50 determines that the function corresponding to the touch operation is to open a certain audio and video file, and controls to open a corresponding audio and video file stored in the storage unit 23 and generate a multimedia signal mixing audio and video, and transmits the multimedia signal to the audio and video processor 14 of the head-mounted apparatus 10 through the data line 30. The audio and video processor 14 receives the multimedia signal and decodes the multimedia signal into the video signal and the display signal, and transmits to headphone apparatus 10 for the audio outputting, and transmits to the display apparatus 11 for the display outputting respectively. Therein, the processor 50 can be a central processing unit, a micro controller, a single chip microcomputer, a digital signal processor, or the like. The audio and video processor 14 can be a decoding chip for decoding audio and video. The storage unit 23 can be a flash memory card, a disk, a solid state disk or the like.

As shown in FIG. 2, the headphone apparatus 12 further includes an audio drive unit 121 and a telephone receiver 122. The display apparatus 11 includes a display drive unit 111, a display 112 and an optical module 113. The processor 50 decodes the obtained multimedia signal into the audio signal and the display signal, and transmits the audio signal to the audio drive unit 121, and transmits the display signal to the display drive unit 111 of the display apparatus 11 coupled to the headphone apparatus 12.

The audio drive unit 121 is configured to drive the telephone receiver 122 to output the corresponding audio according to the audio signal. In detail, the audio drive unit 121 is configured to convert the audio signal in form of the digital signal into the analog signal, and further drive the telephone receiver 122 through the analog signal to output the corresponding volume.

The display drive unit 111 is configured to drive the display 12 to output the corresponding image according to the display signal. The optical module 113 is configured to project the display image displayed by the display 12 into the user's eyes according to a predefined path. Therein, the display image includes the above interface of playing audio and video, and the interface of menu, and the like.

Therein, the display 12 is a micro display.

Therein, as shown in FIG. 1, the headphone apparatus 12 further includes an annular belt 123. The number of the telephone receiver 122 is two. The two telephone receivers 122 are located on two ends of the annular belt 123. The two telephone receivers 122 are electrically coupled to each other through the annular belt 123.

In one embodiment, the processor 50 transmits the obtained multimedia signal to the audio and video processor 14. The audio and video processor 14 decodes the multimedia signal into the video signal and the display signal, controls to transmit the display signal to the display apparatus 11 for the display outputting, and then transmits the audio signal to the headphone apparatus 10 for the audio outputting.

Figure 3:
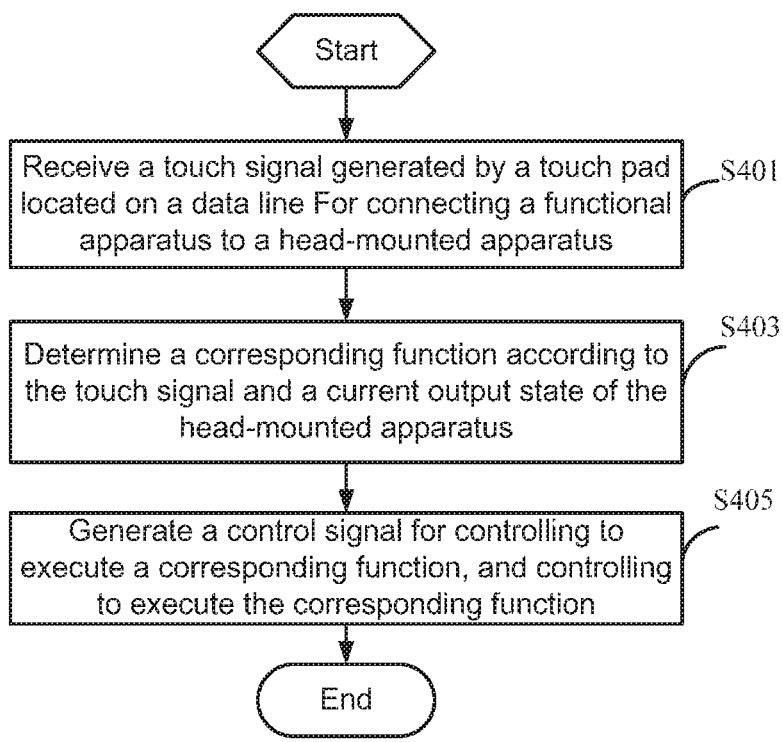
FIG. 3 is a flowchart of a control method of the head-mounted display device in accordance with an embodiment of the present invention.

As shown in FIG. 3, FIG. 3 is a flowchart of a method of the head-mounted display device in accordance with an embodiment of the present invention. The method is configured to control the head-mounted display device described above in any one embodiment. The method includes the steps as follows.

The processor 50 receives the touch signal generated by the touch pad 40 located on the data line 30 coupling the functional apparatus 20 to the head-mounted apparatus 10 (S401).

The processor 50 determines the corresponding function according to the touch signal and the current output state of the head-mounted apparatus 10 (S403). Therein, when the current output state of the head-mounted apparatus 10 is not the audio and video playing state, and the touch operation is the sliding operation, the processor 50 determines that the corresponding function is a function of menu option switching. When the current output state of the head-mounted apparatus 10 is the audio and video playing state, and the touch operation is the sliding operation, the processor 50 determines that the corresponding function is a function of adjusting volume. When the current output state of the head-mounted apparatus 10 is the audio and video playing state, and the touch operation is the click, the processor 50 determines that the corresponding function is pause. When the current output state of the head-mounted apparatus 10 is the audio and video playing state, and the touch operation is the double-click, the processor 50 determines that the corresponding function is a function of awakening the menu, such as, awakening the menu of audio and video files list of the playing interface.

The processor 50 generates the control signal for controlling to execute the corresponding function, and controls to execute the corresponding function (S405).

Therein, in one embodiment, the method further includes steps: when the processor 50 determines that the touch operation is a locking or unlocking touch operation according to the touch signal, and controls the touch pad 40 to switch to be the locking state or the unlocking state. In detail, in this embodiment, the locking or unlocking touch operation is the long press touch operation, when the processor 50 determines that the touching time duration is continuously greater than the second time duration and the coordinates of the touch points are not changed, it is determined to be the long press operation, and the touch pad 40 is controlled to be switched into the locking state or the unlocking state.

Therein, in one embodiment, the method further includes steps: the processor 50 determines that the function corresponding to the touch operation is opening a certain audio and video file, controls to open a corresponding audio and video file stored in the storage unit 23 and generates a multimedia signal mixing the audio and the video, and transmits the multimedia signal to the audio and video processor 14 of the head-mounted apparatus 10 through the data line 30. The audio and video processor 14 receives the multimedia signal and decodes the multimedia signal into the video signal and the display signal, and transmits to the headphone apparatus 10 for the audio outputting, and transmits to the display apparatus 11 for the display outputting.

The above is a preferred embodiment of the present invention, and it should be noted that those skilled in the art may make some improvements and modifications without departing from the principle of the present invention, and these improvements and modifications are also the protection scope of the present invention.

What is claimed is:

1. A head-mounted display device with function of touch input, wherein, the head-mounted display device comprises a head-mounted apparatus, and a functional apparatus, and a data line coupled the head-mounted apparatus and the functional apparatus, the head-mounted apparatus comprises a display apparatus for providing a near-eye display, the functional apparatus and the head-mounted apparatus perform signal transmission through the data line, the head-mounted display device further comprises:

a touch pad, located on the data line, configured to generate a touch signal in response to a touch operation;

a processor, configured to generate a corresponding control signal according to the touch signal;

the processor determines the corresponding control signal according to the touch signal of the touch pad and an output state of the head-mounted apparatus;

when the process receives the touch signal, the processor estimates whether a current output state of the head-mounted apparatus is an audio and video playing state or not; when the current output state is not the audio and video playing state, the processor generates a control signal for menu option switching according to the touch signal corresponding to a sliding operation; when the current output state is the audio and video playing state, the processor generates a control signal of playing the current audio and video file or pause the current audio and video file according to the touch signal corresponding to a click, or generates a control signal of awakening a menu according to the touch signal corresponding to a double-click, or generates a control signal of adjusting playing volume according to the control signal corresponding to a sliding operation.

2. The head-mounted display device according to claim 1, wherein the processor is located on the functional apparatus, the processor outputs the control signal to the head-mounted apparatus to the head-mounted apparatus to control the head-mounted apparatus to execute a corresponding function.

3. The head-mounted display device according to claim 2, wherein the functional apparatus further comprises a touch interface unit coupling the processor and the touch pad, the touch interface unit receives the touch signal generated by the touch pad and transmits the touch signal to the processor.

4. The head-mounted display device according to claim 1, wherein the processor is located on the display apparatus, the display apparatus further comprises a touch interface unit coupling the processor and the touch pad, configured to receive the touch signal generated by the touch pad and transmits the touch signal to the processor.

5. The head-mounted display device according to claims 1, wherein the head-mounted apparatus further comprises a headphone apparatus, configured for outputting audio.

6. The head-mounted display device according to claim 5, wherein the processor is located on the headphone apparatus, the headphone apparatus further comprises a touch interface unit coupling the processor to the touch pad, the touch interface unit is configured to receive the touch signal generated by the touch pad and transmits the touch signal to the processor.

7. The head-mounted display device according to claim 5, wherein the head-mounted apparatus further comprises an audio and video processor, configured to process an audio and video signal into a display signal for the display apparatus outputting and an audio signal for the headphone apparatus outputting.

8. The head-mounted display device according to claim 7, wherein the processor determines that the control signal is to open a certain audio and video file according to the touch signal, the processor controls to open a corresponding audio and video file stored in a storage unit and generates a multimedia signal mixing audio and video, and further transmits the multimedia signal to the audio and video processor through the data line, the audio and video processor receives the multimedia signal and decodes the multimedia signal into the audio signal and the display signal, and transmits to the headphone apparatus for the audio outputting, and transmits to the display apparatus for the display outputting.

9. The head-mounted display device according to claim 1, wherein the touch pad is a flexible touch pad, wrapping around a periphery of the data line.

10. The head-mounted display device according to claim 7, wherein, according to the touch signal corresponding to the sliding operation, and when the current output state of the head-mounted apparatus is the audio and video playing state, the processor further generates the control signal for controlling the corresponding function according to a sliding direction; when the processor determines that it is a direction of sliding up and down, a control signal for adjusting volume is generated to adjust volume; when it is determined that the sliding direction is a direction of sliding left and right, a control signal for controlling to fast forward or fast backward is generated, for controlling the audio and video file currently playing to fast forward or fast backward.

11. The head-mounted display device according to claim 7, wherein, the processor determines that it is the click when there are at least two touch points and a touching time duration of the at least two touch points is less than a first time duration; the processor determines that it is the double-click when there are two clicks at a predefined time duration; the processor determines whether coordinates of the touch points are changed; if the coordinates of the touch points are changed, it is determined to be the sliding operation.

12. The head-mounted display device according to claim 2, wherein, the processor controls the touch pad to switch to be a locking state or an unlocking state when the control signal is a control signal for unlocking/locking.

13. The head-mounted display device according to claim 8, wherein, the headphone apparatus further comprises an audio drive unit and telephone receivers; the display apparatus comprises a display drive unit, a display and an optical module, the audio and video processor receives the multimedia signal transmitted by the processor, decodes the multimedia signal into the audio signal and the display signal, and transmits the audio signal to the audio drive unit, and transmits the display signal to the display drive unit of the display apparatus coupled to the headphone apparatus, the audio drive unit drives the telephone receivers to output the corresponding volume according to the audio signal, and the display drive unit drives the display to output corresponding images according to the display signal, the optical module is configured to project the display image displayed by the display into user's eyes according to a predefined path.

14. A touch control method of a head-mounted display device with function of touch input, wherein, the head-mounted display device comprises a head-mounted apparatus, a functional apparatus, a data line coupled the head-mounted apparatus to the functional apparatus, and a touch pad located on the data line, the method comprises:
   generating a touch signal in response to a touch operation by the touch pad;
   determining a corresponding function according to the touch signal and an output state of the head-mounted apparatus by the head-mounted display device;
   outputting a control signal of controlling the corresponding function to control to execute the corresponding function;
   wherein, the head-mounted display device determines a corresponding function according to the touch signal and an output state of the head-mounted apparatus comprises:
   when a current output state is not an audio and video playing state, and the touch operation is a sliding operation, a control signal for menu option switching is outputted;
   when the current output state is the audio and video playing state and the touch operation is the sliding operation, a control signal for adjusting volume menu option switching is outputted;
   when the current output state is the audio and video playing state and the touch operation is a click, a control signal of pause is outputted;
   when the current output state is the audio and video playing state and the touch operation is a double-click, a control signal of awakening a menu is outputted.

15. The touch control method according to claim 14, wherein, the method further comprises:
   controlling the touch pad to switch to be a locking state or an unlocking state when the processor determines that the control signal is a control signal for unlocking/locking, to enable the touch pad to be touched or not touched.

16. The touch control method according to claim 14, wherein, the method further comprises:
   when it is determined that the corresponding function is to open a certain audio and video file according to the touch signal, opening a corresponding audio and video file and generates a multimedia signal mixing audio and video;
   transmitting the multimedia signal to the head-mounted apparatus through the data line;
   decoding the multimedia signal into the audio signal and the display signal, transmitting to the headphone apparatus for the audio outputting, and transmitting to the display apparatus for the display outputting respectively.

17. A head-mounted display device with function of touch input, comprising a head-mounted apparatus, and a functional apparatus, and a data line coupled the head-mounted apparatus and the functional apparatus, the head-mounted apparatus comprises a display apparatus for providing a near-eye display, the functional apparatus and the head-mounted apparatus perform signal transmission through the data line, the head-mounted display device further comprises:
   a touch pad, located on the data line, configured to generate a touch signal in response to a touch operation;
   a processor, configured to generate a corresponding control signal according to the touch signal;
   wherein, the headphone apparatus further comprises an audio drive unit and telephone receivers; the display apparatus comprises a display drive unit, a display and an optical module, the audio and video processor receives a multimedia signal transmitted by the processor, decodes the multimedia signal into audio signal and display signal, and transmits the audio signal to the audio drive unit, and transmits the display signal to the display drive unit of the display apparatus coupled to the headphone apparatus, the audio drive unit drives the telephone receivers to output the corresponding volume according to the audio signal, and the display drive unit drives the display to output corresponding display images according to the display signal, the optical module is configured to project the display images displayed by the display into user's eyes according to a predefined path.

* * * * *